(12) United States Patent
Song et al.

(10) Patent No.: US 9,563,240 B2
(45) Date of Patent: Feb. 7, 2017

(54) ELECTRONIC DEVICE

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventors: Rong-Rong Song, Wuhan (CN); Dun-Jun Zhou, Wuhan (CN)

(73) Assignees: HONG FU JIN PRECISION INDUSTRY (WuHan) CO., LTD., Wuhan (CN); HON HAI PRECISION INDUSTRY CO., LTD., New Taipei (TW)

( * ) Notice: Subject to any disclaimer, the term of this patent is extended or adjusted under 35 U.S.C. 154(b) by 20 days.

(21) Appl. No.: 14/682,609

(22) Filed: Apr. 9, 2015

(65) Prior Publication Data

US 2016/0224076 A1 Aug. 4, 2016

(30) Foreign Application Priority Data

Jan. 30, 2015 (CN) .......................... 2015 1 0048650

(51) Int. Cl.
*H05K 5/00* (2006.01)
*G06F 1/18* (2006.01)
(52) U.S. Cl.
CPC ..................................... *G06F 1/187* (2013.01)
(58) Field of Classification Search
CPC .......... G06F 1/187; G06F 1/186; G06F 1/185; G06F 1/184; G06F 13/4081; G06F 13/409; H05K 7/1408; H05K 7/1429; H05K 1/14; H05K 7/026
See application file for complete search history.

(56) References Cited

U.S. PATENT DOCUMENTS

| | | | | |
|---|---|---|---|---|
| 5,708,563 A * | 1/1998 | Cranston, III | .......... | G06F 1/184 361/679.6 |
| 6,105,090 A * | 8/2000 | Fosmo | .................... | G06F 1/266 710/302 |
| 7,057,903 B2 * | 6/2006 | Kuo | ........................ | G06F 1/184 312/223.1 |
| 7,898,797 B2 * | 3/2011 | Fan | ........................ | G06F 1/186 353/122 |
| 8,254,097 B2 * | 8/2012 | Lu | ........................... | G06F 1/186 312/223.1 |
| 8,472,210 B2 * | 6/2013 | Chiu | ....................... | G06F 1/185 361/752 |
| 8,807,488 B2 * | 8/2014 | Lee | ........................ | G06F 1/187 248/222.51 |
| 8,942,008 B2 * | 1/2015 | He | ......................... | G06F 1/183 361/752 |
| 9,229,496 B2 * | 1/2016 | Cravens | .................. | G06F 1/187 |

(Continued)

*Primary Examiner* — Robert J Hoffberg
*Assistant Examiner* — Hung Dang
(74) *Attorney, Agent, or Firm* — Zhigang Ma

(57) ABSTRACT

Electronic device includes an enclosure, a motherboard received in the enclosure, a first bracket securing a first electronic module, a transfer card electronically coupled to the motherboard, and a securing member securing the transfer card to the first bracket. The transfer card is substantially perpendicular to the motherboard, the first electronic module is electronically connected to the transferring card, and thereby the motherboard is electronically connected to the first electronic module.

17 Claims, 4 Drawing Sheets

(56) References Cited

U.S. PATENT DOCUMENTS

| | | | |
|---|---|---|---|
| 9,230,606 B2 * | 1/2016 | Ding .................... | G11B 33/022 |
| 2009/0073666 A1 * | 3/2009 | Tsai ........................ | G06F 1/186 |
| | | | 361/740 |
| 2013/0128464 A1 * | 5/2013 | Chen ...................... | H05K 7/026 |
| | | | 361/721 |
| 2013/0155602 A1 * | 6/2013 | Peng ...................... | G06F 1/186 |
| | | | 361/679.32 |
| 2013/0163182 A1 * | 6/2013 | Guo ........................ | G06F 1/187 |
| | | | 361/679.33 |
| 2014/0175112 A1 * | 6/2014 | Yeh ........................ | G07F 9/105 |
| | | | 221/150 A |
| 2016/0124294 A1 * | 5/2016 | Yeh ...................... | G03B 21/208 |
| | | | 353/98 |

* cited by examiner

ELECTRONIC DEVICE

FIELD

The subject matter herein generally relates to an electronic device.

BACKGROUND

An electronic device such as a personal computer usually consists of a host and a display connected to the host. Usually, the host includes a case defining a space receiving a motherboard including electronic components, such as a CPU, a fan, data storage devices, and a front input/output module crammed together. The front input/output module and the data storage devices can be electronically coupled to the motherboard via a plurality of cables arranged in the space of the case.

BRIEF DESCRIPTION OF THE DRAWINGS

Implementations of the present technology will now be described, by way of example only, with reference to the attached figures.

DETAILED DESCRIPTION

Figure 1:
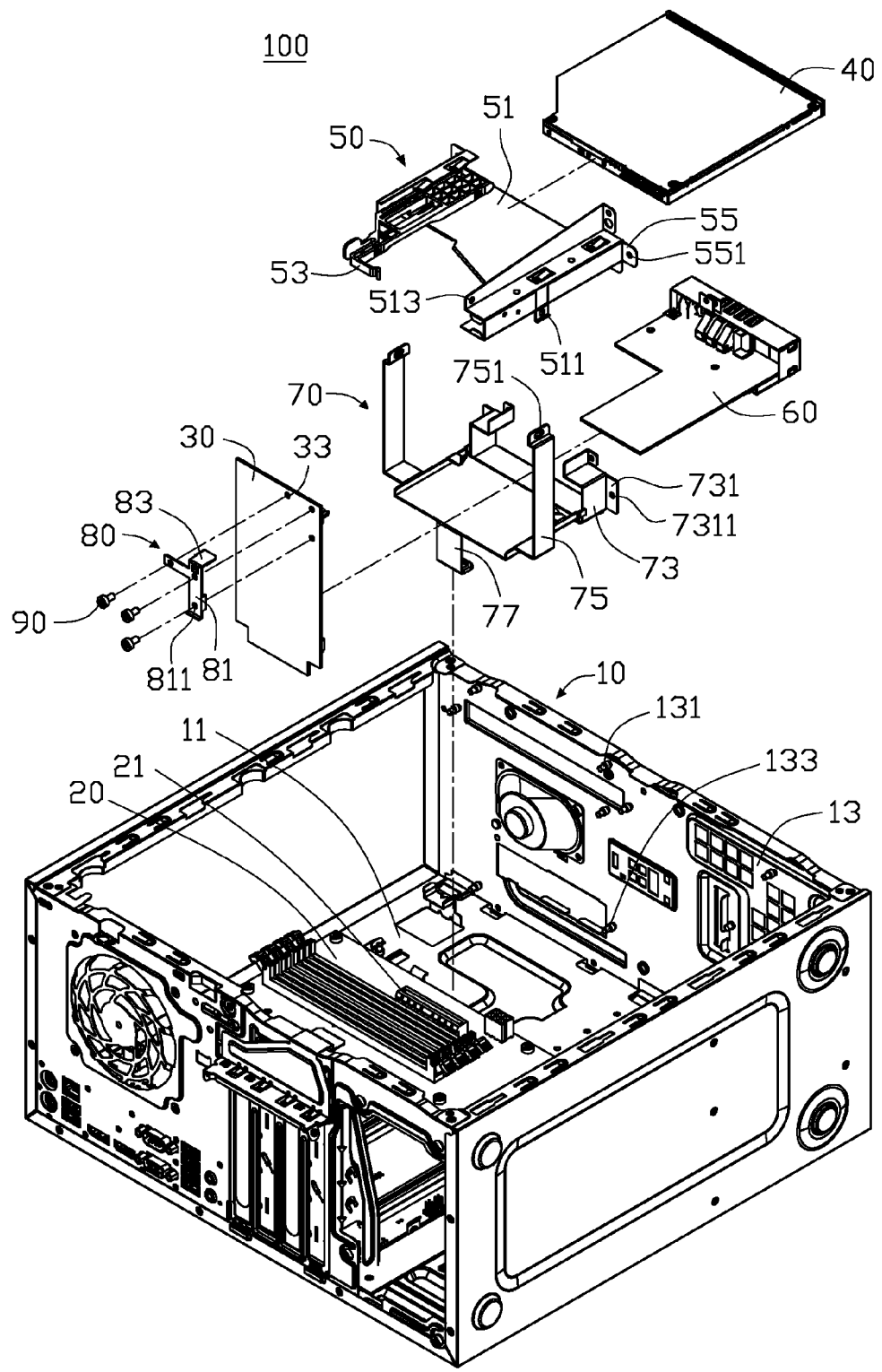
FIG. 1 is an exploded, isometric view of an embodiment of an electronic device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

The present disclosure is described in relation to an electronic device. The electronic device includes an enclosure, a motherboard received in the enclosure, a first bracket securing a first electronic module, a transfer card electronically coupled to the motherboard, and a securing member securing the transfer card to the first bracket. The transfer card is substantially perpendicular to the motherboard, the first electronic module is electronically connected to the transferring card, and thereby the motherboard is electronically connected to the first electronic module.

Figure 2:
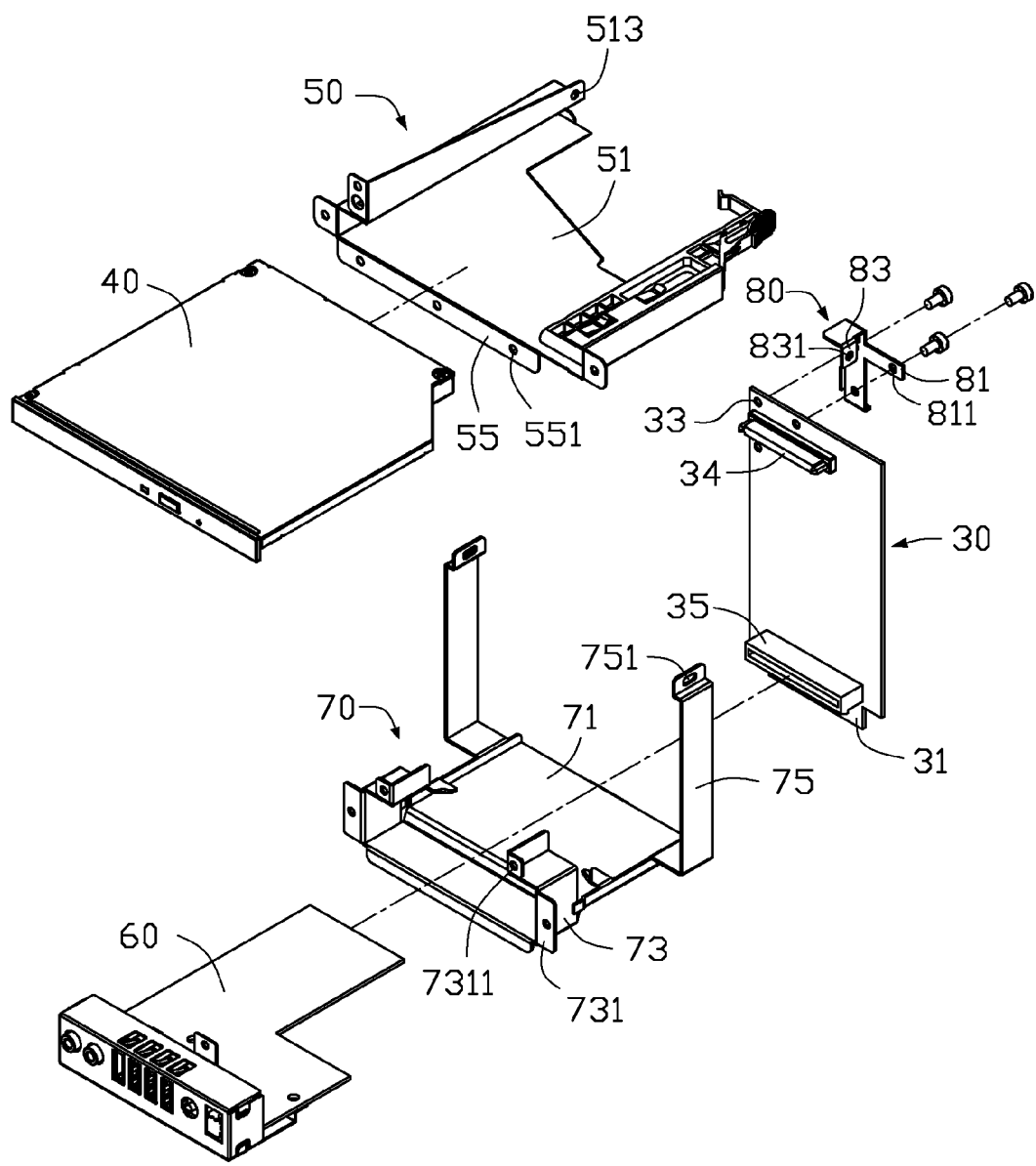
FIG. 2 is similar to FIG. 1, viewed from a different angle, and without an enclosure of the electronic device of FIG. 1.

FIGS. 1 and 2 illustrate an embodiment of an electronic device 100. The electronic device 100 includes an enclosure 10, a motherboard 20, a transfer card 30, a first bracket 50 securing a first electronic module 40, and a second bracket 70 securing a second electronic module 60. In at least one embodiment, the electronic device 100 can be a personal computer, the first electronic module 40 can be a storage, such as an optic disk drive, and the second electronic module 60 can be a front input/output module.

The enclosure 10 can include a bottom plate 11 and a front plate 13 extending from the bottom plate 11. In at least one embodiment, the front plate 13 can be substantially perpendicular to the bottom plate 11. A plurality of first securing posts 131 and a plurality of second securing posts 133 are located on the front plate 13.

The motherboard 20 can be secured to the bottom plate 11, and a plurality of electronic components (not shown) can be located thereon. The plurality of electronic components can be a CPU, a fan, a plurality of data storage devices, and so on, contained together in the enclosure 10. A connector 21 is located on the motherboard 20 and is configured to electronically couple with the transfer card 30.

An inserting portion 31 is located on a first end of the transfer card 30, and three mounting holes 33 are defined in the opposite end of the transfer card. A first transfer connector 34 and a second transfer connector 35 are located on one side of the transfer card 30. The first transfer connector 34 is configured to couple with the first electronic module 40, allowing the first electronic module 40 to electronically couple with the motherboard 20. The second transfer connector 35 is configured to couple with the second electronic module 60, for allowing the second electronic module 60 to electronically couple with the motherboard 20. In at least one embodiment, a plurality of transfer connectors, besides the first and second transfer connectors 34, 35, can be located on the transfer card 30 for connecting a larger number of electronic modules.

The first bracket 50 can include a main body 51, a blocking piece 53 extending from a first end of the main body 51, and a plurality of flanges 55 extending from a second end of the main body 51. The main body 51 is configured to receive the first electronic module 40. A positioning hole 511 is defined in each side of the main body 51. A fixing hole 513 can be defined in the main body 51. The blocking piece 53 is configured to prevent the first electronic module 40 from disengaging from the main body 51. A first fastening hole 551 is defined in each flange 55 and corresponds to each first securing post 131.

A securing member 80 can be used to secure the transfer card 30 to the first bracket 50. The securing member 80 can include a first securing portion 81 and a second securing portion 83. Each of the first securing portion 81 and the second securing portion 83 can be substantially L-shaped. Three first securing holes 811 are defined in the first securing portion 81 and correspond to the three mounting holes 33, and a second securing hole 831 is defined in the second securing portion 83 and corresponds to the fixing hole 513.

The second bracket 70 can include a positioning plate 71, two clipping plates 73, two mounting plates 75, and a supporting plate 77. The two clipping plates 73 and the two mounting plates 75 extend upwardly from opposite edges of the positioning plate 71, and the supporting plate 77 extend downwardly from opposite edges of the positioning plate 71. Each clipping plate 73 can be used to secure the second electronic module 60 to the second bracket 70. In at least one embodiment, each clipping plate 73 can be substantially L-shaped, and a bending piece 731 can extend from each edge of the clipping plate 73. A second fastening hole 7311 is defined in the bending piece 731 and corresponds to the second securing posts 133. In at least one embodiment, each mounting plate 75 can be substantially L-shaped, and a punching hole 751 is defined in the mounting plate 75 and corresponds to the positioning hole 511. The supporting plate 77 can be substantially L-shaped to support on the bottom plate 11.

Figure 3:
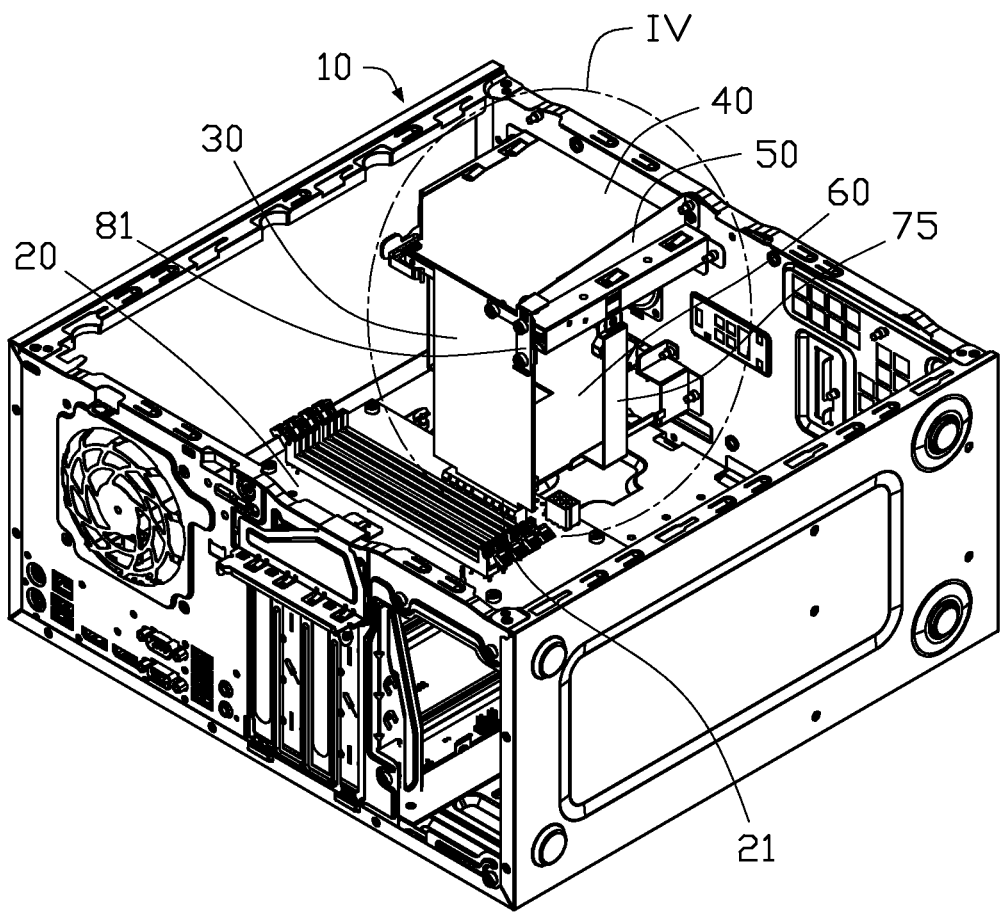
FIG. 3 is an assembled view of the electronic device of FIG. 1.
Figure 4:
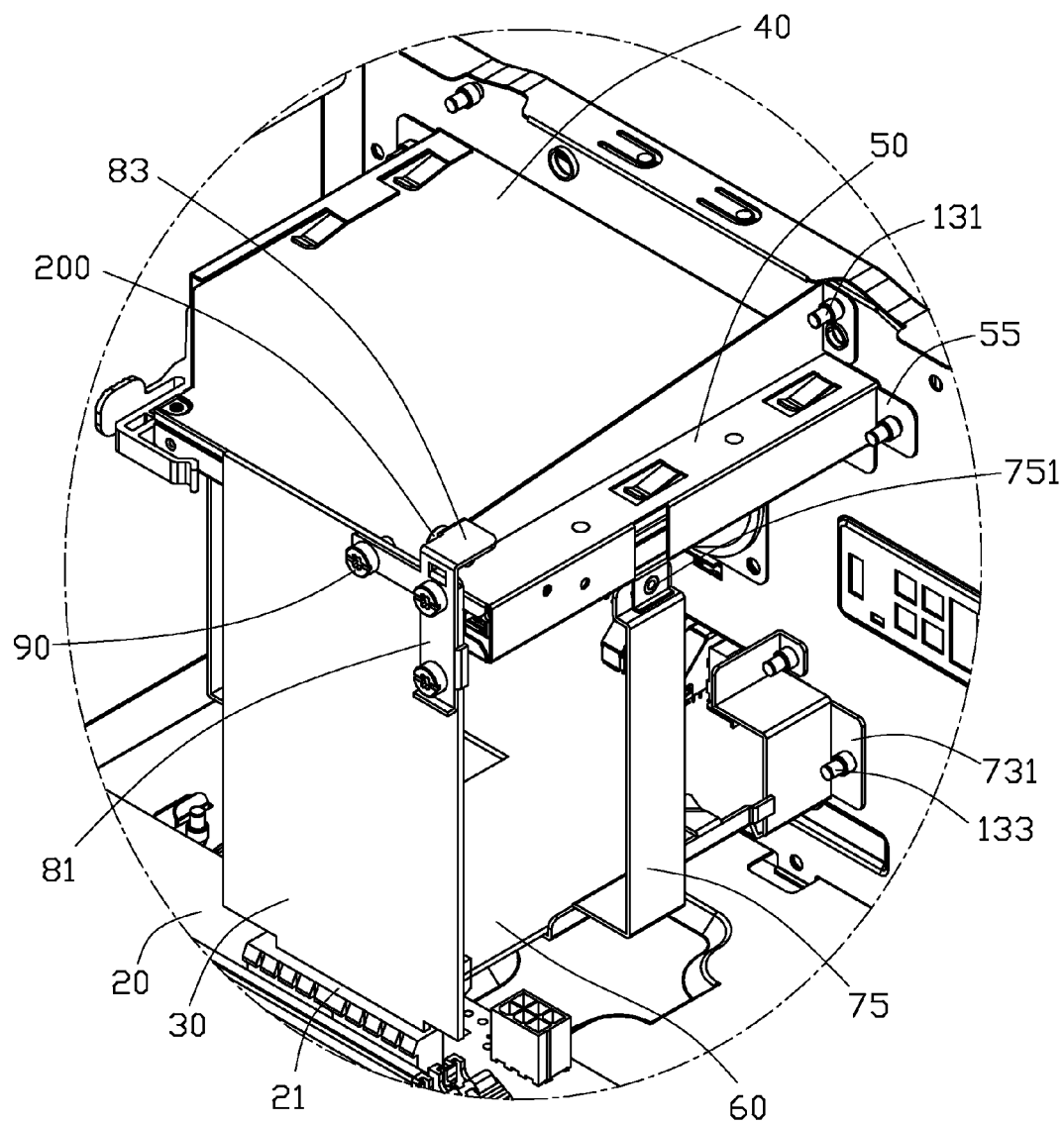
FIG. 4 is an enlarged view of a circled portion IV of FIG. 3.

FIGS. 1, 3 and 4 illustrate an assembled view of the electronic device 100. In assembly, the second bracket 70 is placed in the enclosure 10, and the supporting plate 77 is supported on the bottom plate 11. Each second fastening hole 7311 is aligned with each second securing post 133, and the second securing post 133 is engaged in the second fastening hole 7311 to secure the bending piece 731 to the front plate 13. In at least one embodiment, the bending piece 731 can be secured to the front plate 13 by such means as screws and clips, to secure the second bracket 70 to the front plate 13.

Each first fastening hole 551 is aligned with each first securing post 131, and the first securing post 131 is engaged in the first fastening hole 551 to secure the flange 55 to the front plate 13. In at least one embodiment, the flange 55 can be secured to the front plate 13 by means, such as screws and clips, to secure the first bracket 50 to the front plate 13.

The transfer card 30 is moved in a direction that is substantially perpendicular to the motherboard 20 to engage the inserting portion 31 with the connector 21, so that the transfer card 30 is electronically connected to the motherboard 20. The transfer card 30 abuts the first bracket 50. The first securing portion 81 abuts the transfer card 30, and the first securing holes 811 are aligned with the three mounting holes 33. Three first fastening members 90 are engaged in the first securing holes 811 and the mounting holes 33, and the first securing portion 81 is secured to the transfer card 30. The second securing portion 83 abuts the main body 51, and the second securing holes 831 align with the fixing hole 513. A second fastening member 200 is engaged in the second securing holes 831 and the fixing hole 513, and the second securing portion 83 is secured to the main body 51. Therefore, the transfer card 30 can be secured to the first bracket 50.

In use, the first electronic module 40 is placed in the first bracket 50, and the first electronic module 40 is electronically connected to the first transfer connector 34. Thus, the first electronic module 40 can be electronically connected to the motherboard 20 via the transfer card 30. The second electronic module 60 is placed in the second bracket 70, and the second electronic module 60 is electronically connected to the second transfer connector 35. Thus, the second electronic module 60 can be electronically connected to the motherboard 20 via the transfer card 30.

The embodiments shown and described above are only examples. Many details are often found in the art such as the other features of an electronic device. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. An electronic device comprising:
an enclosure;
a motherboard received in the enclosure;
a first bracket, a first electronic module secured to the first bracket;
a transfer card electronically coupled to the motherboard; and
a securing member securing the transfer card to the first bracket;
wherein the transfer card is substantially perpendicular to the motherboard, the first electronic module is electronically connected to the transfer card, thereby electrically connecting the motherboard to the first electronic module; the enclosure comprises a front plate, the first bracket comprises a main body receiving the first electronic module and a flange extending from the main body, and the flange is secured to the front plate.

2. The electronic device of claim 1, wherein the securing member comprises a first securing portion and a second securing portion coupled to the first securing portion, the first securing portion is secured to the transfer card, and the second securing portion is secured to the first bracket.

3. The electronic device of claim 1, further comprising a second bracket securing a second electronic module, wherein the second bracket is secured to the front plate.

4. The electronic device of claim 3, wherein the transfer card comprises a first transfer connector and a second transfer connector, the first electronic module is electronically connected to the first transfer connector, and the second electronic module is electronically connected to the second transfer connector.

5. The electronic device of claim 3, wherein the first electronic module is an optic disk drive, and the second electronic module is a front input/output module.

6. The electronic device of claim 3, wherein the second bracket comprises a positioning plate receive the second electronic module and a clipping plate extending from the positioning plate, and the second electronic module is secured to the second bracket by the clipping plate.

7. The electronic device of claim 6, wherein the second bracket further comprises a mounting plate extending from the positioning plate, and the mounting plate is secured to the first bracket.

8. The electronic device of claim 7, wherein the positioning plate is substantially parallel to the motherboard, and the mounting plate is substantially perpendicular to the positioning plate.

9. The electronic device of claim 7, wherein the enclosure further comprises a bottom plate, the second bracket further comprises a supporting plate extending from the positioning plate, and the supporting plate supports on the bottom plate.

10. An electronic device comprising:
an enclosure;
a motherboard received in the enclosure and comprising a connector;
a first bracket;

a first electronic module received in the first bracket; and
a transfer card secured to the first bracket;
wherein the transfer card is electronically coupled to the connector, the first electronic module is electronically connected to the transfer card, thereby electronically connecting the motherboard to the first electronic module; the enclosure comprises a front plate, the first bracket comprises a main body receiving the first electronic module and a flange extending from the main body, and the flange is secured to the front plate.

11. The electronic device of claim 10, wherein the transfer card is substantially perpendicular to the motherboard.

12. The electronic device of claim 10, further comprising a securing member, wherein the securing member comprises a first securing portion and a second securing portion coupled to the first securing portion, the first securing portion is secured to the transfer card, and the second securing portion is secured to the first bracket.

13. The electronic device of claim 10, further comprising a second bracket securing a second electronic module, wherein the second bracket is secured to the front plate.

14. The electronic device of claim 13, wherein the transfer card comprises a first transfer connector and a second transfer connector, the first electronic module is electronically connected to the first transfer connector, and the second electronic module is electronically connected to the second transfer connector.

15. The electronic device of claim 13, wherein the second bracket comprises a positioning plate receive the second electronic module and a clipping plate extending from the positioning plate, and the second electronic module is secured to the second bracket by the clipping plate.

16. The electronic device of claim 15, wherein the second bracket further comprises a mounting plate extending from the positioning plate, and the mounting plate is secured to the first bracket.

17. The electronic device of claim 16, wherein the enclosure further comprises a bottom plate, the second bracket further comprises a supporting plate extending from the positioning plate, and the supporting plate supports on the bottom plate.

* * * * *